(12) United States Patent
Dwyer

(10) Patent No.: US 7,244,361 B2
(45) Date of Patent: Jul. 17, 2007

(54) METALS/MINERALS RECOVERY AND WASTE TREATMENT PROCESS

(75) Inventor: Patrick Joseph Dwyer, Valrico, FL (US)

(73) Assignee: Ciba Specialty Chemicals Water Treatments Ltd., Bradford (GB)

( * ) Notice: Subject to any disclaimer, the term of this patent is extended or adjusted under 35 U.S.C. 154(b) by 339 days.

(21) Appl. No.: 10/914,699

(22) Filed: Aug. 9, 2004

(65) Prior Publication Data

US 2005/0109702 A1     May 26, 2005

Related U.S. Application Data

(60) Provisional application No. 60/523,814, filed on Nov. 20, 2003.

(51) Int. Cl.
*C02F 1/56* (2006.01)
(52) U.S. Cl. .................. 210/712; 209/5; 210/727; 210/747; 210/907
(58) Field of Classification Search .................. 210/712
See application file for complete search history.

(56) References Cited

U.S. PATENT DOCUMENTS

| | | | |
|---|---|---|---|
| 3,418,237 A | 12/1968 | Booth et al. .................. 210/54 |
| 3,578,586 A * | 5/1971 | Gal et al. ..................... 210/710 |
| 3,622,087 A | 11/1971 | Oltmann ....................... 241/62 |
| 3,707,523 A | 12/1972 | Ledden et al. ................. 260/41 |
| 3,834,541 A | 9/1974 | Rundell et al. ............. 210/219 |
| 4,194,969 A | 3/1980 | Chung et al. .................... 209/5 |
| 4,224,149 A | 9/1980 | Balcerski et al. ........... 210/705 |
| 4,251,363 A | 2/1981 | Chamberlain et al. ....... 210/727 |
| 4,265,770 A | 5/1981 | Thomas ....................... 210/715 |
| 4,342,653 A | 8/1982 | Halverson .................... 210/734 |
| 4,347,140 A * | 8/1982 | Condolios et al. .......... 210/710 |
| 4,555,346 A | 11/1985 | Rosen et al. ................. 210/734 |
| 4,690,752 A | 9/1987 | Shaw ............................. 209/5 |
| 4,783,270 A * | 11/1988 | Murao et al. ............... 210/734 |
| 5,178,774 A | 1/1993 | Payne et al. ................. 210/727 |
| 5,688,404 A | 11/1997 | Luke et al. .................. 210/734 |
| 6,039,189 A | 3/2000 | Luke ............................. 209/5 |
| 6,077,441 A | 6/2000 | Luke .......................... 210/712 |
| 6,274,045 B1 * | 8/2001 | Kreisler ...................... 210/710 |

(Continued)

FOREIGN PATENT DOCUMENTS

GB     2003127     3/1979

(Continued)

*Primary Examiner*—Peter A. Hruskoci
(74) *Attorney, Agent, or Firm*—Shiela A. Loggins

(57) ABSTRACT

A metals/minerals recovery and waste treatment process comprising a main separation stage in which a metal/mineral-bearing ore is slurried with water and separated into an enriched fraction and an aqueous metal/mineral waste fraction, and a waste sedimentation stage in which the aqueous metal/mineral waste fraction is sedimented in one or more settling lagoons to provide a thickened sediment layer and supernatant; and the waste sedimentation stage comprises feeding the aqueous metal/mineral waste into a solids contact vessel or other flocculating chamber, wherein the aqueous metal/mineral waste is diluted with water containing one or more flocculant(s) at more than one concentration, one of which concentrations is at least 10 times higher than the other, within the SCV, flocculating the diluted aqueous waste, and sedimenting the diluted and flocculated aqueous waste to provide a liquid supernatant layer and a pumpable thickened sediment layer in a settling basin.

20 Claims, 2 Drawing Sheets

U.S. PATENT DOCUMENTS

| | | | |
|---|---|---|---|
| 6,376,561 B1 * | 4/2002 | Allen et al. | 516/113 |
| 6,805,803 B1 | 10/2004 | Weir et al. | 210/728 |
| 6,979,405 B2 * | 12/2005 | Weir | 210/727 |
| 2004/0144731 A1 | 7/2004 | Hartung et al. | 210/723 |

FOREIGN PATENT DOCUMENTS

| | | |
|---|---|---|
| WO | 03/004831 | 1/2003 |

* cited by examiner

METALS/MINERALS RECOVERY AND WASTE TREATMENT PROCESS

This application claims the benefit of Application No. 60/523,814, filed Nov. 20, 2003.

BACKGROUND

This invention relates to a metals and/or minerals recovery and waste treatment process that comprises a main separation stage and a waste sedimentation stage. The objective is to treat waste sediment from a metals and/or minerals processing facility in a novel and efficient manner.

Flocculation is the aggregation of single particles or small groups of particles, into multi-particle aggregates or 'flocs'. The technique is used in many industrial processes to enhance solid-liquid separation.

In terms of definition it is necessary to make a distinction between coagulation and flocculation, since both involve particle aggregation but by different mechanisms. The process of coagulation involves particle aggregation by surface charge neutralization, thereby overcoming the repulsive potential barrier between particles. Particle surface charge is invariably negative and multivalent inorganic coagulants like lime, ferrous sulfate, ferric sulfate and alum are used to effect aggregation and form 'coagula'. Flocculation in the strictest sense of the term is the aggregation of particles by long-chain polymers where particle surface charge may or may not be changed.

The term flocculation is derived from the Latin flocculus, which describes a tuft of wool, since this was likened to the "fluffy" aggregates that resulted from particle flocculation. The term flocculant is sometimes used as an adjective to describe the appearance of flocculated substances.

In general, the mineral processing stage of metals and/or minerals production involves a series of processing steps (see FIG. 1). Once the ore has been extracted from the ground, it requires upgrading (also referred to as beneficiation) to concentrate the metal or mineral values by separating it from the gangue. The separation process can be very simple or very complex involving many unit processes. Generally, one or more of the following unit processes are involved:

Comminution: (also referred to as size reduction)—comprised of two activities, this process involves crushing, followed by grinding in ball or rod mills, to reduce the size of the ore to a point that the minerals are liberated from one another and serves to prepare the material for physical and/or chemical separation.

Separation:—once the ore has been sized, the minerals are then separated by one or more of the following unit processes: size separation, which uses the difference in particle size of the different minerals (e.g., washing clay from sand on a screen); gravity separation, which uses the difference in density or specific gravity of the minerals—equipment used includes dense or heavy media, shaking tables, spirals, barrel washers, or jigs; electrical or magnetic separation, which uses those respective physical properties of the minerals; and froth flotation, which uses surface chemistry differences in the minerals.

Solid/Liquid Separation:—After the values and gangue minerals have been separated using one or more of the above unit processes, the resulting slurries (termed the concentrate and the tailings, respectively) need to be dewatered so they can be transported (in the case of concentrate) and disposed of in an environmentally acceptable manner (in the case of tailings). Types of solid/liquid separation equipment include thickeners, clarifiers, vacuum filters, pressure filters, multi-roll filters, and centrifuges.

Upon completion of the solid/liquid separation unit process of the mineral processing stage, three "product" streams emerge: (1) a recovered water stream that may, or may not, require additional clarification activities prior to being returned to the mining activities portion of the process; (2) a thickened concentrate stream that may, or may not, require additional processing (i.e., metallurgical processing) to produce the finished metal or mineral; and (3) a thickened tailings stream that may, or may not, require additional processing (e.g., pH adjustment) prior to being placed in a tailings pond for sedimentation (to remove and recover residual water) and disposal.

This invention relates to the "products" of the solid/liquid separation stage of mineral processing—i.e., the improved thickening of tailings (also referred to as sediment) and the improved clarity of water recovered for recycling (also referred to as supernatant).

Iron ore, an example of a ferrous metal, is produced from the extraction and processing of two ores: Hematite ($Fe_2O_3$) and/or Magnetite ($Fe_3O_4$). The ores are processed through a five-step process consisting of: (1) mining—the drilling and blasting to break the ore down into a suitable size; (2) crushing—the physical reduction in the size of the ore down to approximately 9 inches in diameter; (3) grinding—the further physical reduction in the size of the ore to liberate the fine mineral from the rock; (4) concentration—the separation of the iron values from the gangue via deslime thickeners (if the ore being processed is hematite) or via magnetic thickeners (if the ore being processed is magnetite) and the subsequent dewatering of the concentrated ore; and (5) pelletization—the formation of small, uniform-size balls "green balls" of iron ore using a chemical binder and the heat hardening of the balls to form hard iron ore pellets for use by steel manufacturing plants.

Sand and gravel, the unconsolidated granular materials resulting from the natural disintegration of rock or stone and an example of an industrial mineral, are typically mined in a wet condition by open pit excavation or dredging. After transportation to a processing plant the wet sand and gravel raw feed is stockpiled or emptied directly into a hopper where large cobbles and boulders are physically separated from the feed. From the hopper, the material is transported to fixed or vibrating screens where oversize material is separated from the smaller, marketable sizes. Oversize material may be used for erosion control, reclamation, or other uses, or it may be directed to a crusher for size reduction, to produce crushed aggregate, or to produce manufactured sands. The material that passes through the screen is fed into a battery of sizing screens, which generally consist of either horizontal or sloped—single or multi-deck—vibrating screens. Rotating trammel screens with water sprays are also used to process and wash wet sand and gravel. Screening separates the sand and gravel into different size ranges. After screening, the sized gravel is transported to stockpiles, storage bins, etc. for subsequent sale. The sand is freed from clay and organic impurities by log washers or rotary scrubbers. After scrubbing, the sand typically is sized by water classification. After classification, the sand is dewatered using screws, separatory cones, or hydro-separators. After processing, the sand is transported to storage bins for subsequent sale.

Flocculation of the waste stream (i.e. tailings) in order to improve the settling characteristics of an industrial process tailings pond has been proposed and practiced in the prior art. In flocculation, individual particles are united into rather loosely bound agglomerates or flocs. The degree of flocculation is controlled by the probability of collision between the particles and their tendency toward adhesion after collision. Agitation increases the probability of collision, and adhesion tendency is increased by the addition of a flocculant.

There have been numerous proposals in the literature to try to accelerate the sedimentation by flocculating the waste, and there have been proposals to improve the structure of the substantially solid waste sediment by adding sands or other materials to the waste. Examples of disclosures of such mineral recovery processes utilizing flocculants are U.S. Pat. Nos. 3,418,237, 3,622,087, 3,707,523, 4,194,969, 4,224,149, 4,251,363, 4,265,770, 4,342,653, 4,555,346, 4,690,752, 5,688,404, 6,077,441 and 6,039,189, which are each incorporated herein by reference.

Despite the numerous proposals to use flocculants, in practice it has been found that their use frequently is not cost effective. Even when a flocculant is used to promote sedimentation and the provision of a supernatant that can be recycled, the quality of the supernatant tends to be rather poor because the supernatant tends to be contaminated with unflocculated waste particles.

It is known within the metals and minerals processing industry that the utilization of above ground sedimentation columns (e.g., tubular metal tanks) allows for the formation of a useful depth of supernatant, provided that such columns have sufficient height. Unfortunately the volume of aqueous wastes which are generated in metals and/or mineral recovery processes can be so large that it is impracticable even to contemplate the provision of column separating tanks of this type.

OBJECT OF THE INVENTION

The object of the invention is to provide a metals and/or minerals recovery and waste treatment process by which it is possible to: (1) obtain and recycle supernatant of improved quality for flotation or other separation steps; (2) utilize sedimentation lagoons more efficiently and (3) to utilize addition of different concentrations of one or more flocculant solutions to achieve improved flocculation efficiency, wherein one of the flocculant solutions is diluted using substantially greater water dilution ratios than usual.

SUMMARY OF THE INVENTION

A metals/minerals recovery and waste treatment process according to the invention comprises a main separation stage in which a metal/mineral-bearing ore is slurried with water and separated into an enriched fraction and an aqueous metal/mineral waste fraction, and a waste sedimentation stage in which the aqueous metal/mineral waste fraction is sedimented in one or more settling lagoons to provide a thickened sediment layer and supernatant; and the waste sedimentation stage comprises feeding the aqueous metal/mineral waste into a Solids Contact Vessel (hereafter referred to as SCV) or other flocculating chamber, wherein the aqueous metal/mineral waste is diluted with water containing a flocculant at more than one concentration, one of which concentrations is at least 10 times higher than the other, within the SCV, flocculating the diluted aqueous waste, and sedimenting the diluted and flocculated aqueous waste to provide a liquid supernatant layer and a pumpable thickened sediment layer in a settling basin. The thickened sediment layer is then fed to one or more final lagoons, thus allowing the thickened sediment to undergo further sedimentation to provide a substantially solid sediment in the one or more final lagoons (see FIG. 1).

Dilution of a concentrated stock solution of the flocculant or flocculant mixture occurs in the feed lines and the distribution lines (see FIG. 2). The flocculant is diluted with large amounts of water so that various dilute concentrations of the flocculant or flocculant mixture may be applied to the SCV.

DETAILED DESCRIPTION OF THE INVENTION

Figure 1:
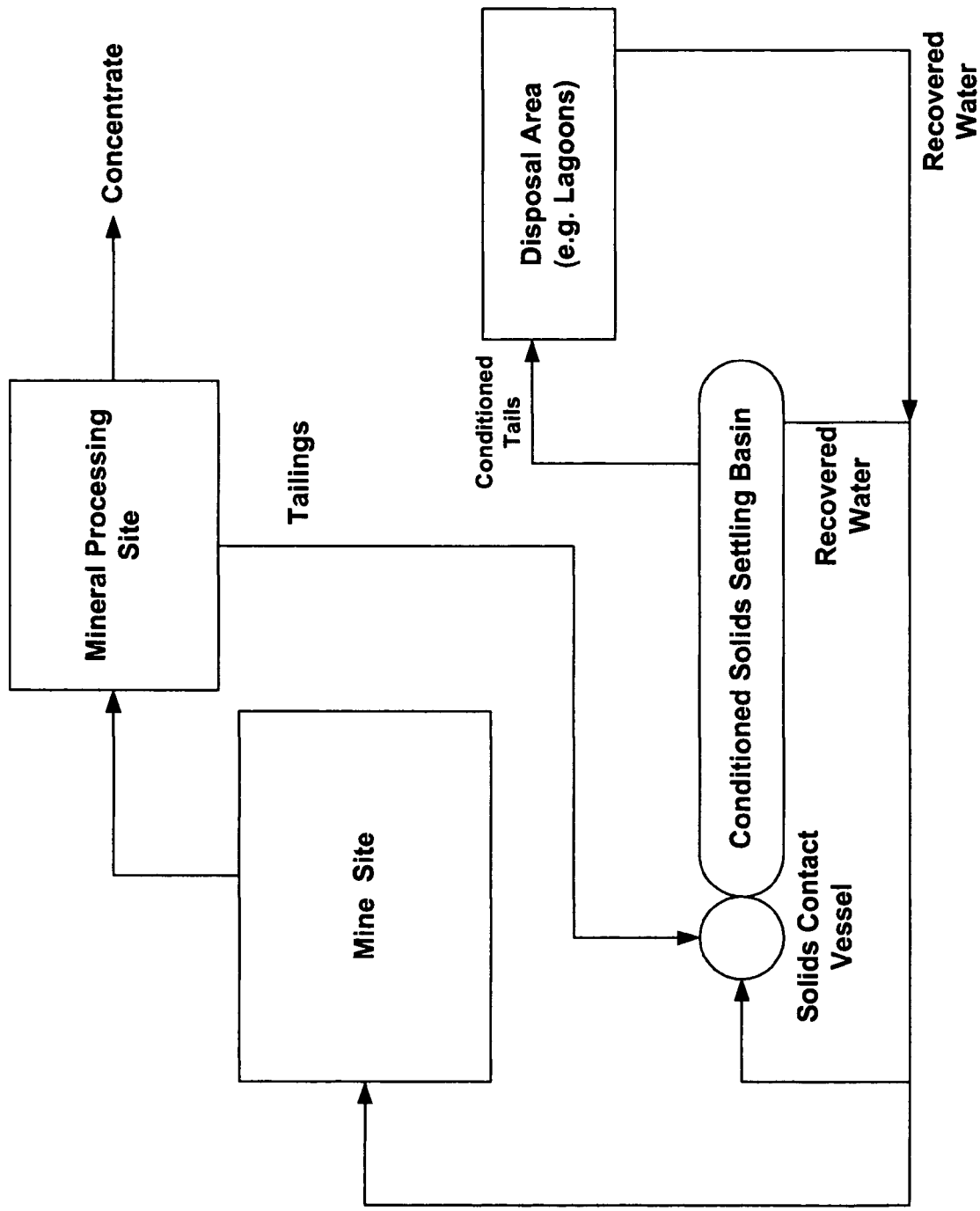
FIG. 1 is a schematic diagram of an industrial materials processing system.

It is known to reduce the required dosage of flocculant by introducing a high dilution effect in a SCV. In conventional methods a flocculant solution is applied directly to a wastewater slurry and more vigorous mixing in a launder is relied upon to provide a suitable solids/flocculant interface for flocculation to ensue. This can possibly cause a reduction in the effectiveness of the flocculant.

In the present invention, a large amount of dilution water is added to one part of the flocculant solution. This results in a large quantity of very dilute flocculant that, in turn, is mixed with the incoming wastewater slurry in the SCV (see FIG. 2). Due to the high dilution, the mixing requirements are reduced and the contact between solids and flocculant is increased, thus making for more effective flocculation and reducing the overall flocculant usage. In conventional systems, the flocculant is diluted to a concentration of about 0.05%. In the present invention, the dilution factor is to 0.005% or less by weight for this very dilute part of the flocculant solution.

According to the present invention further efficiencies in polymeric flocculant usage are gained by the simultaneous introduction of an additional, more concentrated flocculant solution into the SCV. This combination of the blending of various flocculant concentrations, (to adapt to the changes of the incoming slurries) and strategic application methods is a key part of the invention.

Typically about 75% of the diluted flocculant, for example 70 to 80%, is applied at a concentration of about 0.005% or less by weight (=concentration 1) and the remainder is applied to areas within the SCV at a concentration of about 0.05% or less by weight (=concentration 2), with the proviso that concentration 2 is at least 10 times higher than concentration 1, for example at least 30 times higher and especially at least 50 times higher than concentration 1. This 75%/25% ratio may be changed to adapt to the various flows coming into the SCV. The ratio may range from 75% to 25% at concentration 1 and 25% to 75% at concentration 2.

As a result of simultaneously using flocculant solutions having two different concentrations according to the invention, the total amount of flocculant required is substantially reduced.

A further advantage of employing the SCV is that it gives an extended period of turbulent flow to achieve optimum flocculation while maintaining suspension of the flocs formed and any coarse material present, to avoid premature deposition in the SCV.

In general, the invention is applicable to any process in which the separation of a metal and/or mineral from a raw mined rock or other material comprises slurring with water and thereby producing large volumes of aqueous metal/mineral waste that are then subjected to sedimentation in lagoons. A description/characterization of the typical waste streams generated by each of the segments within the metals and minerals industry follows:

The typical waste sedimentation system employed within the Ferrous Metals industry sector is tailings ponds and lagoons. Waste streams exiting the mineral processing stage of iron ore (a ferrous metal) production typically exhibit the following characteristics:

| Total Solids Content: 3.0-35.0% W/V (weight/volume) Specific Gravity: 1.0-1.3 Particle Size Distribution | | | | |
|---|---|---|---|---|
| Size Range (μm) | Solids in Range (%) | Nominal Particle Size (μm) | Cumulative % Below | Cumulative % Above |
| >1180 | 0.00 | 1180 | 100.00 | 0.00 |
| 1180-600 | 0.00 | 600 | 100.00 | 0.00 |
| 600-300 | 0.09 | 300 | 99.91 | 0.09 |
| 300-212 | 1.70 | 212 | 98.21 | 1.79 |
| 212-106 | 25.34 | 106 | 72.87 | 27.13 |
| 106-53 | 5.28 | 53 | 67.59 | 32.41 |
| <53 | 67.59 | | | | pH (as supplied at 25° C.): 7.0-8.0 SU
Color: Green - Brown

The typical waste sedimentation system employed within the Base Metals industry sector is tailings ponds and lagoons. Waste streams exiting the mineral processing stage of copper (a base metal) production typically exhibit the following characteristics:

| Total Solids Content: 15.0-35.0% W/V Specific Gravity: 1.1-1.3 Particle Size Distribution | | | | |
|---|---|---|---|---|
| Size Range (μm) | Solids in Range (%) | Nominal Particle Size (μm) | Cumulative % Below | Cumulative % Above |
| >1180 | 0.00 | 1180 | 100.00 | 0.00 |
| 1180-600 | 0.03 | 600 | 99.97 | 0.03 |
| 600-300 | 15.40 | 300 | 84.57 | 15.43 |
| 300-212 | 16.98 | 212 | 67.59 | 32.41 |
| 212-106 | 23.25 | 106 | 44.34 | 55.66 |
| 106-53 | 7.90 | 53 | 36.44 | 63.56 |
| <53 | 36.44 | | | | pH (as supplied at 25° C.): 7.0-8.0 SU
Color: Grey - Green

The typical waste sedimentation system employed within the Precious Metals industry sector is tailings ponds and lagoons. Waste streams exiting the mineral processing stage for gold (a precious metal) production typically exhibit the following characteristics:

| Total Solids Content: 12.0-60.0% W/V Specific Gravity: 1.0-1.4 Particle Size Distribution | | | | |
|---|---|---|---|---|
| Size Range (μm) | Solids in Range (%) | Nominal Particle Size (μm) | Cumulative % Below | Cumulative % Above |
| >1180 | 0.00 | 1180 | 100.00 | 0.00 |
| 1180-600 | 0.00 | 600 | 100.00 | 0.00 |
| 600-300 | 0.05 | 300 | 99.95 | 0.05 |
| 300-212 | 0.66 | 212 | 99.29 | 0.71 |
| 212-106 | 10.08 | 106 | 89.21 | 10.79 |
| 106-53 | 18.59 | 53 | 70.62 | 29.38 |
| <53 | 70.62 | | | | pH (as supplied at 25° C.): 8.0-8.5 SU
Color: Red - Brown

The typical waste sedimentation system employed within the Industrial Minerals industry sector is generally a type of conventional or high rate thickener. Lagoon systems are also employed in some areas, for example, phosphate mining. Waste streams exiting the mineral processing stage of sand and gravel (an industrial mineral) production typically exhibit the following characteristics:

| Total Solids Content: 5.0-20.0% W/V Specific Gravity: 1.0-1.3 Particle Size Distribution | | | | |
|---|---|---|---|---|
| Size Range (μm) | Solids in Range (%) | Nominal Particle Size (μm) | Cumulative % Below | Cumulative % Above |
| >1180 | 0.93 | 1180 | 99.07 | 0.93 |
| 1180-600 | 3.43 | 600 | 95.64 | 4.36 |
| 600-300 | 21.79 | 300 | 73.85 | 26.15 |
| 300-212 | 18.51 | 212 | 55.34 | 44.66 |
| 212-106 | 24.55 | 106 | 30.79 | 69.21 |
| 106-53 | 12.63 | 53 | 18.16 | 81.84 |
| <53 | 18.16 | | | | pH (as supplied at 25° C.): 7.0-8.0 SU
Color: Red - Orange

The typical waste sedimentation system employed within the Coal industry sector is generally a type of thickener: conventional, high rate, or deep cone. Waste streams exiting the mineral processing stage of coal production typically exhibit the following characteristics:

| Total Solids Content: 1.0-8.0% W/V Specific Gravity: 1.0-1.3 ml/g Particle Size Distribution | | | | |
|---|---|---|---|---|
| Size Range (μm) | Solids in Range (%) | Nominal Particle Size (μm) | Cumulative % Below | Cumulative % Above |
| >1180 | 0.00 | 1180 | 100.00 | 0.00 |
| 1180-600 | 0.15 | 600 | 99.85 | 0.15 |
| 600-300 | 4.12 | 300 | 95.73 | 4.27 |
| 300-212 | 4.61 | 212 | 91.12 | 8.88 |
| 212-106 | 7.29 | 106 | 83.83 | 16.17 |
| 106-53 | 12.90 | 53 | 70.93 | 29.07 |
| <53 | 70.93 | | | | pH (as supplied at 25° C.): 7.5-8.5 SU
Color: Black

The inventive process exhibits benefits when employed within the five distinct segments of the Metals and Minerals Industry. In general, the process is applied at the Solid/Liquid Separation stage of mineral processing operations within each segment. In particular, the waste stream (i.e., tailings) exiting the separation stage of mineral processing operations is subjected to flocculation with the flocculant solutions in a Solids Contact Vessel (SCV), and sedimentation and consolidation in a Conditioned Solids Settling Basin (CSSB); followed by separation of the consolidated tails from the supernatant liquid, and, optionally, withdrawal from the CSSB and placement in a lagoon.

When the process is a metal and/or mineral recovery process, the main separation stage can involve any of the conventional separation procedures in such processes. For instance, it may involve cycloning the slurry or it may involve subjecting the slurry to flotation.

An advantage of the present invention is the formation of a recycle stream having a reduced amount of suspended solids. A relatively dirty recycle stream can adversely affect the mineral processing operation and cause excessive metal/mineral losses, cause an increase in the amount of mineral processing reagents needed in the recovery process, and result in excessive non-value solids in the recovered metal/mineral.

The aqueous waste from metal/mineral processing is a slurry consisting primarily of waste mineral particles in water. In general, the aqueous mineral waste generally contains not more than 20% and usually not more than 10% total mineral solids by weight, but usually contains at least 0.1% and usually at least 0.5% by weight total mineral solids. The solids generally consist wholly or mainly of mineral fines but can include some coarser waste or some coarser mineral values, such that the coarser material can be sedimented from the waste while the fines remain in suspension. The mineral fines usually constitute at least 20% and usually at least 10% by weight of the dry matter of the waste.

If the aqueous mineral waste contains coarse mineral values or other coarse settleable material, these materials may be sedimented from the waste as it flows through a launder towards the SCV (for instance as described in U.S. Pat. No. 5,688,404), or these values may be sedimented in a lagoon prior to the SCV treatment of the present invention. Thus the waste containing the mineral values may be directed into an entry area of a settling lagoon, and the resulting reduction in flow velocity that occurs as the waste enters the lagoon causes sedimentation of the mineral values primarily in the entry area. The mineral values can then be recovered from the base of the entry area or, if appropriate, from the base of the entire lagoon by excavation.

The aqueous mineral waste, optionally after preliminary sedimentation of coarse materials, then flows into a SCV that has either been formed in the ground or exists as a piece of equipment. The SCV can be located within or in the vicinity of a primary lagoon, an existing mine cut, a channel, an emergency spillway, a secondary containment area, or virgin territory. In a preferred embodiment, the SCV is located in any convenient location, such as a primary lagoon, more particularly at the base or waste entrance of a primary lagoon. The SCV may be made by excavation of, for example, a square, rectangular, circular or oval area in the ground to a sufficient depth. Optionally, the SCV may be made of a fabricated piece of equipment existing either above ground, at ground level, or below ground. If desired, the SCV can be lined in order to prevent erosion of the walls, but this is usually unnecessary.

The dimensions for the SCV in the inventive process can vary widely depending on the flow rate. Generally they comprise a depth of from about 6 to about 20 feet or deeper as convenient, preferably about 10 to about 15 feet, and an upper surface area (generally approximating a square or round area) which gives a flow rate of 0.01 to 1, preferably 0.1 to 0.5, U.S. gallons per minute per square foot of surface area. The required surface area depends on the flow rate of the waste. The SCV provides an optimum environment for the flocculant and solids contact. Once the solids have been flocculated, the SCV will feed the Conditioned Solids Settling Basin (CSSB) via a weir and/or channel.

As a result of utilizing a SCV and an associated CSSB instead of a settlement column, it is possible to generate a very large volume and a deep settlement zone very cost-effectively.

A supernatant layer and a thickened sediment layer are formed within the CSSB from the aqueous waste layer fed into the SCV. The supernatant layer can be removed, pumped or otherwise drawn from the top of the CSSB provided this removal does not disturb the thickened sediment layer at the bottom of the CSSB. Generally the supernatant layer is removed from the CSSB by overflowing the CSSB during substantially continuous feed into the CSSB, generally at the opposite end. The removal of the supernatant layer can be by any convenient manner, for instance it can be removed through a channel and piped back to the separation stage, in which event the CSSB can be installed in any suitable location.

In one embodiment, the CSSB is formed in a lagoon that is already substantially filled with substantially solid mineral sediment. Thus, by practicing the invention, a lagoon that has already been substantially filled with sediment can be given a new and very important purpose by excavating or installing a treatment SCV and then relying on the existing sediment in the lagoon (in this instance serving as a CSSB) to provide a polishing of the supernatant. The rate of increase of sediment in the lagoon as a result of this polishing process is extremely slow, so the lagoon can be given an almost indefinite extension in its useful life.

The phrase "substantially filled" means that the lagoon is too shallow to be useful for separation of clear supernatant from sediment, for instance as a result of the horizontal component of the flow velocity exceeding the vertical component of the settling rate.

The aqueous mineral waste stream is diluted with the two different concentrations of flocculants ranging from 0.05% to 0.0005% in the SCV, one of which concentrations is at least 10 times higher than the other, in such a way as to optimize flocculation with minimum flocculant usage. The flocculant can be added to the dilution water in solid form, but more usually it is added as a previously prepared solution, typically having a flocculant concentration of about 0.1 to 0.5% by weight, in a conventional manner. The dilution water containing the two different concentrations of flocculant can be added to the wastewater after it has entered the SCV but may also be added to the wastewater before it enters the SCV. The addition point can be just prior to the entry to the SCV or it can be at a substantially earlier position, for instance as described in U.S. Pat. No. 5,688,404.

In one embodiment the dilution water containing the two different concentrations of flocculant is added to the waste as it flows through a mixing device which discharges into the SCV. The mixing device can be a duct or other suitable device, such as a tank, or small well formed in the ground, through which the waste flows with sufficient turbulence to promote good mixing of the flocculant into the waste. The turbulence may be generated solely by the rate of flow through the duct or by baffles or other turbulence inducers or by the injection of water within the duct. If desired, mechanical rotors, static mixers or other mechanical mixing apparatus can be provided to achieve suitable mixing of the flocculant into the waste, sufficient to give substantially uniform flocculation.

The most effective dosage of the flocculant for sedimentation applications may be selected by conventional test methods. It is usually 0.01 to 1, preferably about 0.0125 to about 0.75, pounds of flocculant per ton of solids in the waste that is being flocculated.

The selection of both the flocculant and dosage amounts can be determined by selection procedures described herein so as to obtain the optimum combination of clarity, depth of supernatant and rate of settling on the one hand and pumpable, thickened sediment on the other.

The flocculant can be any water-soluble flocculant that is capable of promoting flocculation and therefore separation of the aqueous waste into a supernatant and a thickened sediment. The flocculant is generally a water-soluble flocculant formed from one or more ethylenically unsaturated monomers. The monomers may be nonionic, anionic or cationic. Similarly, the flocculant may be nonionic, anionic or cationic, or it may be amphoteric.

Suitable anionic monomers include ethylenically unsaturated carboxylic or sulfonic monomers such as acrylic acid, methacrylic acid and 2-acrylamido-2-methyl propanesulfonic acid (AMPS) (a US trademark of the Lubrizol Corporation). Acrylamide is a suitable nonionic monomer. Suitable cationic monomers include dialkylaminoalkyl (meth)-acrylates and -acrylamides, usually as their quaternary ammonium or acid addition salts, or diallyl dimethyl ammonium chloride.

Anionic flocculants are preferred.

Preferred anionic flocculants are copolymers of 5-70% by weight, generally 10-50% by weight, anionic monomers such as acrylic acid (usually as sodium acrylate) and/or AMPS with other monomers, generally acrylamide. Particularly preferred anionic copolymers include MAGNAFLOC® 336, MAGNAFLOC® 358, MAGNAFLOC® 919, MAGNAFLOC® 1011, MAGNAFLOC® 3230, MAGNAFLOC® 4240, MAGNAFLOC® 5250, or MAGNAFLOC® 6360, all from Ciba Specialty Chemicals Corporation, Suffolk, Va.

Suitable cationic flocculants are formed of 1-50% by weight, generally 2-15% by weight, of cationic monomers such as dimethyl aminoethyl-acrylate or -methacrylate acid additions or quaternary salts together with other monomers, generally acrylamide. Particularly preferred cationic flocculants are MAGNAFLOC® 455 or ZETAG® 7623, both from Ciba Specialty Chemicals Corporation, Suffolk, Va.

The molecular weight of the flocculant is generally such that the flocculant has an intrinsic viscosity ("IV") (measured using a suspended level viscometer, in 1N sodium chloride buffered to pH 7 at 20° Celsius) of at least 4 dl/g and usually at least 8 dl/g. When the flocculant is anionic, the IV is typically 10-30 dl/g, and when it is cationic the IV is typically 8-15 dl/g.

The flocculant can be synthesized in a known manner, for example by gel polymerization, reverse phase bead polymerization, or reverse phase emulsion polymerization or by any other suitable technique.

Figure 2:
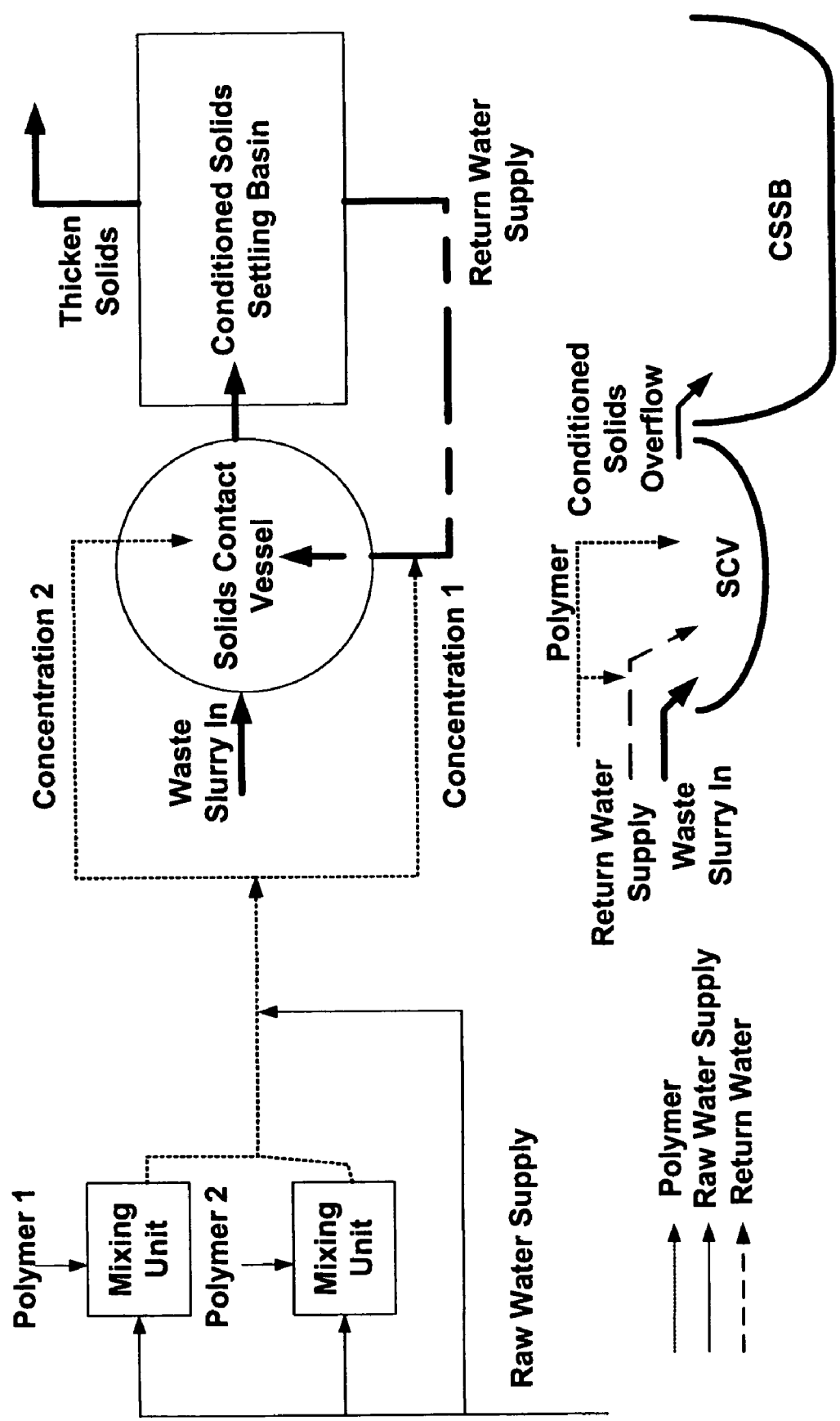
FIG. 2 is a schematic diagram of part of an industrial materials processing system according to the invention.

FIG. 2 illustrates the dilution of flocculants designated Polymer 1 and Polymer 2. These flocculants may be the same or different.

In one embodiment of the invention, the flocculants are different. Preferably the two flocculants are of the same type, for example both anionic, but differing in molecular weight and/or charge density. Preferably the two flocculants are both anionic.

The theoretical residence time of the dilute aqueous mineral waste in the Conditioned Solids Settling Basin (CSSB) is usually from 5 minutes to 5 hours, preferably 10 minutes to 3 hours.

The thickened mineral sediment is removed from the CSSB at a position significantly below the supernatant and/or at a time such that removal does not undesirably impair the quality of the supernatant. The removal may be continuous or discontinuous. The solids content of sediment will generally increase towards the bottom of the CSSB and, in order to minimize the risk of the CSSB gradually filling up with sediment, it is therefore desirable to remove the thickened mineral sediment from as close to the bottom of the CSSB as possible.

The sediment that is removed from the CSSB generally has a solids content at least 2 times, and often up to 10 times the solids content of the original dilute aqueous mineral waste stream which is being flocculated. Often the solids content of the thickened sediment is from about 10% to about 30% dry weight solids. This is measured by taking a sample of the thickened sediment of known weight and evaporating the liquid component or moisture at a known temperature (typically 110° Celsius) in a standard laboratory drying oven. The solids content should preferably be as high as is practicable but must not be so high that the sediment is not conveniently pumpable.

Sediment removal can preferably be accomplished by pumping, such as by using a fixed pump positioned on the ground near the side of the CSSB and connected by a pipe to near the base of the CSSB for drawing off thickened sediment from the CSSB, or by using a pump which floats on the supernatant and has a pipe extending down to near the base of the CSSB.

The thickened sediment is removed from the CSSB to one or more final lagoons where it is spread over the lagoon and allowed to settle and evaporate to form the desired final, substantially solid, sediment. Because the thickened sediment removed from the CSSB has a much higher solids content than conventional waste, the amount of sedimentation and evaporation which is required to provide the final solid sediment is much less than in conventional processes, and there may be no incentive to try to recycle any residual supernatant (because of the increased amount of supernatant which has been recovered—and recycled to the process—from the CSSB). Accordingly, the one or more final lagoons do not have to have as deep a settling volume as is normally considered necessary. As a result, the thickened sediment can be pumped into lagoons that are partially, or almost entirely, full of sediment.

The invention thus has the further advantages that it can simultaneously provide (1) enhanced recovery of supernatant (often of very high clarity) while (2) using lagoons that would normally be considered to be too full and too shallow for many purposes.

Test Procedure: Flocculant Solution Preparation

Scope & Objective: To dissolve solid-grade flocculant in water to prepare a solution suitable for further analysis. This procedure uses solid-grade flocculant as supplied to produce solutions at nominal concentration (refer to Note 1 below)—account may be taken of the flocculant dry weight to produce solutions of precise concentration (refer to Note 2 below).

Aqueous solutions of flocculants are prepared using special wetting techniques to avoid the formation of agglomerates, which impair dissolution.

Procedure: [Step 1] Label an 8-ounce bottle with appropriate product details. [Step 2] Mix the solid flocculant sample to ensure it is homogeneous. [Step 3] Weigh accurately the required weight of solid flocculant into the clean, dry 8-ounce bottle. [Step 4] Add the required volume of acetone from a dispenser and gently swirl to wet the solid flocculant. [Step 5] Add the required volume of deionized water from a dispenser. [Step 6] Screw the top on the bottle and shake vigorously until the flocculant is fully dispersed throughout the solution and has swelled sufficiently to prevent the flocculant from either sticking together or sticking to the sides of the bottle. If the flocculant agglomerates or sticks to the sides of the bottle, the sample should be discarded. The whole preparation procedure must then be repeated. [Step 7] Place the sample bottle containing the flocculant solution on a tumbler and tumble for two hours to provide sufficient agitation to allow for complete dissolution of the flocculant.

Note 1: Flocculant and Reagent Quantities Required to Produce Solutions at Nominal Concentrations:

| Desired Flocculant Concentration (%) | Amount of Flocculant (g.) | Amount of Acetone (ml.) | Amount of Water (ml.) |
|---|---|---|---|
| 0.5% | 0.5 ± 0.002 g. | 5 ± 0.1 ml. | 95 ± 0.5 ml. |
| 1.0 | 1.0 ± 0.002 g. | 5 ± 0.1 ml. | 95 ± 0.5 ml. |
| 1.33 | 2.0 ± 0.002 g. | 5 ± 0.1 ml. | 144 ± 0.5 ml. |
| 2.5 | 2.5 ± 0.002 g. | 5 ± 0.1 ml. | 93.5 ± 0.5 ml. |
| 5.0 | 5.0 ± 0.002 g. | 5 ± 0.1 ml. | 90 ± 0.5 ml. |

Note 2: Preparation of a Precise Concentration Flocculant Solution:

To produce 100 milliliters of flocculant solution:

$$\text{Weight of flocculant (g)} = \text{Desired Concentration (\%)} \times \frac{100}{\text{Dry Wt. of Flocculant}}$$

Test Procedure: Slurry Characterization

Scope & Objective: These methods are used to measure the solids content of slurries encountered within the Metals and Minerals Industry. It is important to realize that different procedures exist depending on whether the sample is from a low solids industrial effluent or a hydrometallurgical plant or coal washery. Samples from industrial effluents tend to be of reasonably high dissolved solids content. Samples from hydrometallurgical plants tend to be high in both suspended and dissolved solids. Samples from coal washeries tend to be of high-suspended solids content but low dissolved solids content.

Characterization 1: Total Solids Content

Procedure: (Note: Testing is to be carried out in duplicate to ensure accuracy of measurement). [Step 1] Stir the slurry sample to be tested to ensure that it is homogeneous. [Step 2] Weigh a clean, dry 100-milliliter measuring cylinder to the nearest 0.01 gram. [Step 3] While stirring the slurry, sample 100+0.5 milliliters of the slurry into the pre-weighed 100 milliliter cylinder using a 250 milliliter plastic beaker. [Step 4] Weigh the cylinder and its contents to the nearest 0.01 gram. [Step 5] Transfer the whole of the sample to a 250-milliliter glass beaker (pre-weighed to the nearest 0.01 gram). Wash the cylinder with de-ionized water and transfer all of the washings from the cylinder to the beaker. [Step 6] Place the beaker and its contents in a 110° Celsius laboratory oven overnight to dry—note: if the result is needed in a shorter amount of time, the sample may be placed in a microwave oven once the following precautions are taken: (a) place a piece of punctured cling film over the beaker to prevent loss of material via spitting; (b) if drying completely, ensure that a sample of water is also placed in the microwave oven—as the microwave oven must never be used when completely dry; and (c) if the sample being dried is substantially coal or another combustible material, ensure that the sample doesn't ash or burn. [Step 7] Transfer the beaker and its dried contents from the oven to a desiccator and allow it to cool for 10 minutes. [Step 8] Re-weigh the beaker and its dried contents to the nearest 0.01 gram.

Calculations a. % total solids content $(W/V) = \frac{(W4 - W3) \times 100}{V}$ $= S1$ (to the nearest 0.1%)

where: $W4$ = weight of beaker and dried contents (in grams);

$W3$ = weight of empty beaker (in grams);

$V$ = volume of slurry taken (in milliliters).

b. % total solids content $(W/W) = \frac{(W4 - W3)}{W2 - W1} \times 100$ $= S2$ (to nearest 0.1%)

Where: $W2$ = weight of cylinder and slurry (in grams);

$W1$ = weight of empty cylinder (in grams)

c. Specific Gravity ($SG$) of slurry $= \frac{S1}{S2}$ (measure to two decimal places)

Characterization 2: Suspended Solids Content

Procedure: (Note: Testing is to be carried out in duplicate to ensure accuracy of measurement). [Step 1] Condition labeled No. 1 Whatman filter papers by placing them in a 110° Celsius laboratory oven for at least 10 minutes. [Step 2] Transfer the filter papers to a desiccator and allow them to cool. Weigh to the nearest 0.0001 gram. [Step 3] Stir the slurry to be sampled to ensure that it is homogeneous. [Step 4] Weigh a clean, dry 100-milliliter measuring cylinder to the nearest 0.01 gram. [Step 5] While stirring the slurry, sample a known volume of slurry (dependant upon the expected suspended solids content) into the pre-weighed measuring cylinder using a 250-milliliter plastic beaker. [Step 6] Weigh the cylinder and its contents to the nearest 0.01 gram. [Step 7] Filter the cylinder's contents and washings through the pre-weighed filter paper using a vacuum funnel. [Step 8] Place the filter paper and its contents into a 110° Celsius laboratory oven until completely dry. [Step 9] Transfer the filter paper and its dried contents to a desiccator and allow it to cool for 10 minutes. [Step 10] Weigh the filter paper and contents to the nearest 0.0001 gram.

Calculations a. % suspended solids content $(W/V) = \frac{(W8 - W7)}{V} \times 100$ $= S3$ (to the nearest 0.1%)

-continued where: $W8$ = weight of filter paper and dried contents (in grams);
$W7$ = weight of empty filter paper (in grams);
$V$ = volume of slurry taken (in milliliters).

b. % suspended solids content $(W/W) = \dfrac{(W8 - W7)}{W6 - W5} \times 100$ $= S4$ (to nearest 0.1%)

where: $W8$ = weight of filter paper and dried contents (in grams);
$W7$ = weight of empty filter paper (in grams);
$W6$ = weight of cylinder and slurry (in grams);
$W5$ = weight of empty cylinder (in grams).

Characterization 3: Dissolved Solids Content

Procedure: [Step 1] Stir the slurry to be sampled to ensure that it is homogeneous. [Step 2] While stirring the slurry, sample a known volume of slurry (dependant upon the expected dissolved solids content and the volume of sample available) using a 250-milliliter plastic beaker. [Step 3] Filter the whole sample with washings through a No. 1 Whatman filter paper into a clean Buchner funnel under vacuum to remove suspended solids matter. [Step 4] Transfer the filtered solution with washings to an appropriate sized, pre-weighed glass beaker (if beaker size is <250-milliliters, measure to the nearest 0.0001 gram; if >250-milliliters, measure to the nearest 0.01 gram). [Step 5] Place the beaker and its contents in a 110° Celsius oven overnight to dry—note: if the result is needed in a shorter amount of time, the sample may be placed in a microwave oven once the following precautions are taken: (a) place a piece of punctured cling film over the beaker to prevent loss of material via spitting; (b) if drying completely, ensure that a sample of water is also placed in the microwave oven—as the microwave oven must never be used when completely dry; and (c) if the sample being dried is substantially coal or another combustible material, ensure that the sample doesn't ash or burn. [Step 6] Transfer the beaker and its dried contents from the oven to a desiccator and allow it to cool for 10 minutes. [Step 7] Re-weigh the beaker and its dry contents to the same precision as the beaker was weighed initially (i.e., to the nearest 0.0001 grams or the nearest 0.01 grams).

Calculations a. % dissolved solids content $(W/V) = \dfrac{(W12 - W11)}{V} \times 100$ $= S5$ (to the nearest 0.1%)

where: $W12$ = weight of beaker and dried contents (in grams);
$W11$ = weight of empty beaker (in grams);
$V$ = volume of slurry taken (in milliliters).

Characterization 4: Particle Size Analysis

[Note: The particle size distribution of the solid component of a slurry can have a significant effect on flocculant performance and demand, and can be determined down to the 62 μm fraction using wet sieving techniques, as detailed in the procedure below.]

Procedure: [Step 1] Sample a known weight of slurry into a suitably sized beaker. [Step 2] Place the sieves (usually 1000 μm, 500 μm, 250 μm, 125 μm, and a 62 μm sieve) in descending size order in the sieve cascade apparatus. [Step 3] Pour the whole of the sample with washings into the top sieve and wash through each sieve. [Step 4] Care should be taken that the bottom sieve doesn't blind or overflow. [Step 5] Once each sieve has been thoroughly washed, stack the sieves and dry. [Step 6] Weigh the dried solids retained on each sieve.

Calculations a. The solids content of the slurry should first be measured in accordance with:

Weight of dry solids present $= \dfrac{W - Sw}{100} = Wt$

Where: $W$ = weight of sample taken (in grams);
$Sw$ = total solids content of slurry (% $W/W$ – i.e., $S2$)

b. % Retained at each Particle Size Fraction:

i. % > sieve 1 $= \dfrac{W1}{Wt} \times 100$ ii. % > sieve 1; < sieve 2 $= \dfrac{W2}{Wt} \times 100$ iii. % > sieve 2; < sieve 3 $= \dfrac{W3}{Wt} \times 100$ iv. etc. for % > sieve 3; < sieve 4 and % > sieve 4; < sieve 5 v. % < sieve 5 $= \dfrac{Wt - (W1 + W2 + W3 + W4 + W5)}{Wt} \times 100$ where: $W1$ = weight of solids retained on sieve 1 (in grams);
$W2$ = weight of solids retained on sieve 2; etc.;
$W5$ = weight of solids retained on sieve 5.

The results should be quoted as:
1) % retained at each particle size fraction (e.g., % retained at 1000 μm) and should be quoted to one decimal place.
2) % undersize (to one decimal place).

Test Procedure 1: High Dilution Testwork—Single Concentration

Scope & Objective: It is possible to reduce the required dosage of flocculant by introducing a dilution effect. To determine the level of flocculant reduction achievable, a series of dose levels are evaluated. The main difference between this method and the standard method is the way in which the flocculant is applied to the slurry. In conventional methods the flocculant solution is applied directly to the slurry and more vigorous mixing in a launder is relied upon to provide a suitable solids/flocculant interface for flocculation to ensue, causing a possible reduction in the effectiveness of the flocculant. In the present invention, a much greater quantity of dilution water is employed to which the flocculant solution is added. This results in a large quantity of extremely dilute flocculant that, in turn, is added to the incoming slurry. Due to the large dilution, the mixing requirements are reduced and the contact between solids and flocculant increased, thus making for more effective flocculation and reduced flocculant dosage.

Procedure: [Step 1] Prepare 0.5% flocculant solutions. [Step 2] Dilute flocculant solutions to the required concentration (usually 0.05%). [Step 3] Take 500-milliliters of slurry in a 2000-milliliter beaker. In a graduated cylinder, take 500-millileters of water. [Step 4] To the cylinder of dilution water, add the appropriate dose level of flocculant solution via a syringe and invert the cylinder to ensure homogeneity. [Step 5] Using a Heidolph Overhead Laboratory Stirrer incorporating a marine impellor, mix the slurry at 400 rpm. Slowly add the dilution water containing flocculant to the slurry and continue mixing for 30 seconds. [Step 6] Transfer the dilute, flocculated material to a 1000-milliliter cylinder and measure the time taken for the mud-line to pass between two fixed points: 3 cm and 8 cm from the surface (1000-milliliter mark). Supernatant liquid turbidity should also be assessed using a spectrophotometer, along with a visual reading of the underflow volume after 10 minutes. [Step 7] A graph of settlement rate against dose is drawn for each product evaluated.

Calculations:

a. Final Solids Content $(FC) = \dfrac{\text{Initial Solids Content}}{2}$ b. Volume of flocculant required for desired dosage:

$$\text{flocculant required (in g/t)} = \dfrac{FC \times V \times (DG/1000)}{1000 \times C}$$

or $$\text{flocculant required (in lbs/ton)} = \dfrac{SD \times V \times DD}{2420 \times C}$$

where: $DG$ = desired dosage (in grams per metric tonne);
$DD$ = desired dosage (in pounds per U.S. ton); and
$C$ = flocculant concentration.

c. Settlement Rate $(\text{cm/min}) = \dfrac{300}{ST}$

Settlement Rate $(\text{in/min}) = \dfrac{118.11}{ST}$

Where: $ST$ = settlement time, seconds.

Test Procedure 2: High Dilution Testwork—Dual Concentration

Scope & Objective: It is possible to reduce the required dosage of flocculant by introducing a dilution effect combined with a dual concentration. To determine the level of flocculant reduction achievable, a series of dose levels are evaluated. The main difference between this method and the standard high dilution—single concentration method, is the way in which the flocculant is applied to the slurry. In the conventional high dilution—single concentration method the flocculant solution is applied solely to the dilution water. This results in a large quantity of extremely dilute flocculant that, in turn, is added to the incoming slurry. Due to the large dilution, the mixing requirements are reduced and the contact between solids and flocculant increased. In the inventive method, the flocculant is added in two stages, at two different concentrations. The first addition is added to the dilution giving an extremely dilute concentration; the second stage is added at the initial concentration to the dilute, flocculated material. This effectively allows for the flocs to combine, making larger flocs, which subsequently settle faster. The second addition also aids capture of any fines that may not have been collected by the first dilute addition.

Procedure: [Step 1] Prepare 0.5% flocculant solutions. [Step 2] Dilute flocculant solutions to required concentration (usually 0.05%). [Step 3] Sample 500 milliliters of slurry in a 2000-milliliter beaker. In a cylinder, take 500-millileters of water. [Step 4] To the cylinder of dilution water, add the half of the appropriate dose level of flocculant solution via a syringe and invert to ensure homogeneity. [Step 5] Using a Heidolph Overhead Laboratory Stirrer incorporating a marine impellor, mix the slurry at 400 rpm. Slowly add the dilution water containing flocculant {Conc. 1} to the slurry and continue mixing for 10 seconds. [Step 6] Add the second half of flocculant solution {Conc. 2} to the dilute, flocculated slurry. Continue stirring for an additional 20 seconds. [Step 7] Transfer the dilute, flocculated material to a 1000-milliliter cylinder and measure the time taken for the mud-line to pass between two fixed points: 3 cm and 8 cm from the surface (1000-milliliter mark). Supernatant liquid turbidity should also be assessed using a spectrophotometer, along with a visual reading of the underflow volume after 10 minutes. [Step 7] A graph of settlement rate against dose is drawn for each product evaluated.

Calculations:

a. Final Solids Content $(FC) = \dfrac{\text{Initial Solids Content}}{2}$ b. Volume of flocculant required for desired dosage:

$$\text{flocculant required (in g/t)} = \dfrac{FC \times V \times (DG/1000)}{1000 \times C}$$

or $$\text{flocculant required (in lbs/ton)} = \dfrac{SD \times V \times DD}{2420 \times C}$$

where: $DG$ = desired dosage (in grams per metric tonne);
$DD$ = desired dosage (in pounds per U.S. ton); and
$C$ = flocculant concentration.

c. Settlement Rate $(\text{cm/min}) = \dfrac{300}{ST}$

Settlement Rate $(\text{in/min}) = \dfrac{118.11}{ST}$

Where: $ST$ = settlement time, seconds.

The following examples describe certain embodiments of this invention as applied to substrates from various segments within the Metals and Minerals Industry, but the invention is not limited thereto. It should be understood that numerous changes to the disclosed embodiments could be made in accordance with the disclosure herein without departing from the spirit or scope of the invention. These examples are therefore not meant to limit the scope of the invention. Rather, the scope of the invention is to be determined only by the appended claims and their equivalents. In these examples all parts given are by weight unless otherwise indicated. All of the flocculants employed are available from Ciba Specialty Chemicals Corporation, Suffolk, Va.

Example 1

The results detailed in this example detail how three different methods of flocculant addition perform on a sample of phosphatic clay. Each table represents use of a different flocculant product to further illustrate that the performance improvements obtained by using the dual concentration method of addition are not limited to an isolated case and that the performance benefits are achieved with each evaluation.

| Flocculant; MAGNAFLOC ® 336 | | | | |
|---|---|---|---|---|
| Flocculant Addition Method | Dose ppm | Dose lbs/T | Settlement Rate, in/min | Underflow Volume, ml | Supernatant Turbidity, NTU* |
| Conventional | 2 | 0.48 | 0.20 | 380 | 790 |
|  | 4 | 0.96 | 0.78 | 200 | 335 |
|  | 6 | 1.44 | 5.97 | 120 | 179 |
| High Dilution - Single Concentration | 1 | 0.48 | 1.96 | 220 | 141 |
|  | 1.5 | 0.72 | 3.48 | 165 | 102 |
|  | 2 | 0.96 | 6.69 | 120 | 93 |
| High Dilution - Dual Concentration | 1 | 0.48 | 8.68 | 100 | 82 |
|  | 1.5 | 0.72 | 19.08 | 90 | 59 |
|  | 2 | 0.96 | 47.24 | 80 | 71 |

*NTU = Nephelometric Turbidity Units

| Flocculant; MAGNAFLOC ® 4240 | | | | | |
|---|---|---|---|---|---|
| Flocculant Addition Method | Dose ppm | Dose lbs/T | Settlement Rate, in/min | Underflow Volume, ml | Supernatant Turbidity, NTU |
| Conventional | 3 | 0.72 | 1.58 | 270 | 354 |
|  | 4 | 0.96 | 4.12 | 120 | 234 |
|  | 5 | 1.20 | 7.91 | 110 | 149 |
| High Dilution - Single Concentration | 1 | 0.48 | 3.42 | 160 | 119 |
|  | 1.5 | 0.72 | 8.97 | 120 | 117 |
|  | 2 | 0.96 | 12.73 | 100 | 96 |
| High Dilution - Dual Concentration | 1 | 0.48 | 13.75 | 100 | 82 |
|  | 1.5 | 0.72 | 17.73 | 90 | 70 |
|  | 2 | 0.96 | 27.21 | 90 | 65 |

| DP203-9832* | | | | | |
|---|---|---|---|---|---|
| Flocculant Addition Method | Dose ppm | Dose lbs/T | Settlement Rate, in/min | Underflow Volume, ml | Supernatant Turbidity, NTU |
| Conventional | 3 | 0.72 | 0.55 | 275 | 366 |
|  | 4 | 0.96 | 2.03 | 150 | 324 |
|  | 5 | 1.20 | 7.83 | 120 | 173 |
| High Dilution - Single Concentration | 1 | 0.48 | 2.45 | 190 | 96 |
|  | 1.5 | 0.72 | 5.34 | 130 | 74 |
|  | 2 | 0.96 | 11.92 | 100 | 61 |
| High Dilution - Dual Concentration | 1 | 0.48 | 5.99 | 120 | 63 |
|  | 1.5 | 0.72 | 19.17 | 100 | 37 |
|  | 2 | 0.96 | 39.37 | 90 | 38 |

*DP203-9832 is an anionic developmental product, based on the same chemistry as the Ciba ® MAGNAFLOC ® range.

The results shown below are extrapolated to detail the conditions required to achieve a target settlement rate of 6 in/minute. Where the target settlement rate was not achieved, the closest value to the target was used.

| Conditions to Provide 6 in/min Settlement Rate using MAGNAFLOC ® 336 | | | | |
|---|---|---|---|---|
| Flocculant Addition Method | Dose lbs/T | Settlement Rate, in/min | Underflow Volume, ml | Supernatant Turbidity, NTU |
| Conventional | 1.44 | 6.00 | 120 | 179 |
| High Dilution - Single Concentration | 0.91 | 6.00 | 128 | 94.5 |
| High Dilution - Dual Concentration | 0.48 | 8.68 | 100 | 82 |

| Conditions to Provide 6 in/min. Settlement Rate using MAGNAFLOC ® 4240 | | | | |
|---|---|---|---|---|
| Flocculant Addition Method | Dose lbs/T | Settlement Rate, in/min | Underflow Volume, ml | Supernatant Turbidity, NTU |
| Conventional | 0.84 | 6.00 | 184 | 380 |
| High Dilution - Single Concentration | 0.59 | 6.00 | 141 | 119 |
| High Dilution - Dual Concentration | 0.48 | 13.75 | 100 | 82 |

| Conditions to Provide 6 in/min. Settlement Rate using DP203-9832 | | | | |
|---|---|---|---|---|
| Flocculant Addition Method | Dose lbs/T | Settlement Rate, in/min | Underflow Volume, ml | Supernatant Turbidity, NTU |
| Conventional | 0.89 | 6.00 | 180 | 340 |
| High Dilution - Single Concentration | 0.75 | 6.00 | 125 | 73 |
| High Dilution - Dual Concentration | 0.48 | 6.00 | 120 | 63 |

From the three tables above it can clearly be seen that for each of the flocculants evaluated, the dual concentration method of addition achieves the desired settlement rate (or better in the case of MAGNAFLOC® 336 and MAGNAFLOC® 4240) at the lowest dose level. This method also provides improvement in both underflow volume and supernatant turbidity.

Example 2

Using the dual addition technique described above, the following results detail the effect of applying two different flocculants blended at various ratios:

| Product | | Product Combination Ratio (A:B) | Dose ppm | Dose lbs/T | Settlement Rate, in/min | Underflow Volume, ml | Supernatant Turbidity, NTU |
|---|---|---|---|---|---|---|---|
| A | B | | | | | | |
| MAGNAFLOC 336 | DP203-9832 | 100:0 | 1.5 | 0.63 | 4.15 | 160 | 184 |
| | | | 2 | 0.84 | 5.99 | 150 | 164 |
| | | | 2.5 | 1.05 | 12.99 | 130 | 130 |
| | | 0:100 | 1.5 | 0.63 | 4.20 | 170 | 127 |
| | | | 2 | 0.84 | 6.62 | 140 | 114 |
| | | | 2.5 | 1.05 | 11.99 | 130 | 89 |
| | | 75:25 | 1.5 | 0.63 | 3.05 | 220 | 73 |
| | | | 2 | 0.84 | 7.87 | 140 | 136 |
| | | | 2.5 | 1.05 | 14.60 | 130 | 109 |
| | | 60:40 | 1.5 | 0.63 | 3.40 | 190 | 171 |
| | | | 2 | 0.84 | 12.35 | 120 | 99 |
| | | | 2.5 | 1.05 | 17.84 | 120 | 101 |
| | | 50:50 | 1.5 | 0.63 | 3.28 | 190 | 164 |
| | | | 2 | 0.84 | 9.69 | 130 | 113 |
| | | | 2.5 | 1.05 | 17.58 | 130 | 102 |
| | | 40:60 | 1.5 | 0.63 | 2.95 | 200 | 163 |
| | | | 2 | 0.84 | 7.15 | 150 | 131 |
| | | | 2.5 | 1.05 | 12.98 | 130 | 95 |
| | | 25:75 | 1.5 | 0.63 | 4.12 | 170 | 141 |
| | | | 2 | 0.84 | 6.30 | 150 | 123 |
| | | | 2.5 | 1.05 | 11.59 | 130 | 92 |

The results below detail the conditions required to achieve a 6 in/min. settlement rate.

| Product | | Product Combination Ratio (A:B) | Dose, lbs/T | Underflow Volume, ml | Supernatant Turbidity, NTU |
|---|---|---|---|---|---|
| A | B | | | | |
| Magnafloc 336 | DP203-9832 | 100:0 | 0.84 | 150 | 164 |
| | | 0:100 | 0.80 | 144 | 117 |
| | | 75:25 | 0.762 | 164 | 121 |
| | | 60:40 | 0.686 | 164 | 149 |
| | | 50:50 | 0.72 | 160 | 139 |
| | | 40:60 | 0.785 | 161 | 139 |
| | | 25:75 | 0.82 | 152 | 125 |

These results indicate that not only does a dual product treatment provide performance improvements, but that the ratio at which the two products are applied also affects performance.

Examples 3 and 4 provide evidence that the dual concentration method of addition is not limited to phosphatic clays; it is also beneficial in other industries. Examples 3 and 4 detail the effect on substrates from the iron ore industry and the sand & gravel industry, respectively.

Example 3

Iron Ore - Using MAGNAFLOC ® 370

| Flocculant Addition Method | Dose ppm | Dose lbs/T | Settlement Rate, in/min | Underflow Volume, ml | Supernatant Turbidity, NTU |
|---|---|---|---|---|---|
| Conventional | 1.00 | 0.05 | 3.38 | 65 | 247 |
| | 1.50 | 0.07 | 4.76 | 60 | 121 |
| | 2.00 | 0.10 | 5.26 | 70 | 111 |
| High Dilution - Single | 0.50 | 0.05 | 5.99 | 70 | 135 |
| | 0.75 | 0.07 | 6.36 | 70 | 110 |
| Concentration | 1.00 | 0.10 | 6.80 | 70 | 76 |
| High Dilution - Dual | 0.50 | 0.05 | 6.01 | 70 | 124 |
| Concentration | 0.75 | 0.07 | 7.62 | 70 | 102 |
| | 1.00 | 0.10 | 9.00 | 65 | 56 |

The results in the above table indicate that the dual concentration method of addition achieves improved both settlement rate and supernatant turbidity Example 4

Sand & Gravel - Using Magnafloc ® 5250

| Flocculant Addition Method | Dose ppm | Dose lbs/T | Settlement Rate, in/min | Underflow Volume, ml | Supernatant Turbidity, NTU |
|---|---|---|---|---|---|
| Conventional | 4.00 | 0.048 | 4.86 | 160 | 29 |
| | 6.00 | 0.072 | 7.56 | 150 | 24 |
| | 8.00 | 0.096 | 9.92 | 140 | 27 |
| High Dilution - Single | 0.50 | 0.012 | 4.58 | 180 | 57 |
| | 0.75 | 0.018 | 5.35 | 170 | 51 |
| Concentration | 1.00 | 0.024 | 7.46 | 160 | 48 |
| High Dilution - Dual | 0.50 | 0.012 | 6.07 | 160 | 60 |
| | 0.75 | 0.018 | 8.02 | 160 | 60 |
| Concentration | 1.00 | 0.024 | 8.73 | 160 | 53 |

The results below detail the conditions required to achieve comparative settlement rate of 6 in/min. using Magnafloc® 5250.

| Flocculant Addition Method | Dose lbs/T | Settlement Rate, in/min | Underflow Volume, ml | Supernatant Turbidity, NTU |
|---|---|---|---|---|
| Conventional | 0.0575 | 6 | 156.0 | 26.5 |
| High Dilution - Single Concentration | 0.0200 | 6 | 166.5 | 49.5 |
| High Dilution - Dual Concentration | 0.0120 | 6 | 160.0 | 60.0 |

From these results it can be seen that a dosage level in the range of five times less than the conventional method is required to give the desired settlement rate in the dual concentration method of addition. The slightly inferior water quality obtained is within the requirements for return water and would not outweigh the economic benefits of significantly reducing the dosage.

What is claimed is:

1. A metals/minerals recovery and waste treatment process comprising a main separation stage in which a metal/mineral-bearing ore is slurried with water and separated into an enriched fraction and an aqueous metal/mineral waste fraction, and a waste sedimentation stage in which the aqueous metal/mineral waste fraction is sedimented in one or more settling lagoons to provide a thickened sediment layer and supernatant; and the waste sedimentation stage comprises feeding the aqueous metal/mineral waste into a Solids Contact Vessel or other flocculating chamber, wherein the aqueous metal/mineral waste fraction is diluted with water containing a flocculant at more than one concentration, one of which concentrations is at least 10 times higher than the other, within said Solids Contact Vessel or other flocculating chamber, wherein said concentration of flocculant range from 0.05 to 0.0001% by weight, and said flocculant has an intrinsic viscosity of at least 4 dl/g, flocculating the diluted aqueous waste, and sedimenting the diluted and flocculated aqueous waste to provide a liquid supernatant layer and a pumpable thickened sediment layer in a settling basin.

2. A process according to claim 1, wherein 25 to 75% of the flocculant is diluted to a concentration of about 0.005% or less by weight and the other 75 to 25% is diluted to a concentration of about 0.05% or less by weight.

3. A process according to claim 2, wherein about 75% of the diluted flocculant is diluted to a concentration of about 0.005% or less by weight and about 25% is diluted to a concentration of about 0.05% or less by weight.

4. A metals/minerals recovery and waste treatment process according to claim 1 in which the flocculant is nonionic, anionic, cationic or amphoteric.

5. A metals/minerals recovery and waste treatment process according to claim 1, which is a ferrous metal, base metal, precious metal, phosphate mining, sand and gravel or coal production process.

6. A process according to claim 1, wherein the diluted aqueous waste flows at a rate within the Solids Contact Vessel of 0.01 to 1 U.S. gallons per minute per square foot of surface area.

7. A process according to claim 1 in which the Solids Contact Vessel has been dug or placed in a primary lagoon which contains substantially solid sediment from the metal/mineral recovery process.

8. A process according to claim 7 in which the one or more settling lagoons and the one or more final lagoons are substantially filled with a substantially solid sediment from the metal/mineral recovery process.

9. A process according to claim 8 in which in which the two different flocculants are both anionic.

10. A process according to claim 1 in which the supernatant liquid flows over a substantially solid sediment in a primary lagoon before being recycled to the main separation stage.

11. A process according to claim 1 in which the thickened sediment layer has a solids content ranging from 2 to 10 times the solids content of the dilute aqueous metal/mineral waste.

12. A process according to claim 1 in which two different flocculants are used.

13. A process according to claim 12 in which the in which two different flocculants are of the same but differ in molecular weight and/or charge density.

14. A process according to claim 1 in which the recovery process is a ferrous metals recovery process.

15. A process according to claim 1 in which the recovery process is a metals recovery process.

16. A process according to claim 1 in which the recovery process is a precious metals recovery process.

17. A process according to claim 1 in which the recovery process is an industrial minerals recovery process.

18. A process according to claim 17 in which the mineral is selected from the group consisting of the industrial minerals group comprising chemical and fertilizer minerals; construction materials; clay, ceramic and refractory minerals; and miscellaneous nonmetallic minerals selected from the group consisting of asbestos, asphalt rock, diatomite, feldspar, graphite, gypsum, precious stones and quartz.

19. A process according to claim 1 in which the recovery process is a coal recovery process.

20. A process according to claim 1 in which the recovery process is a phosphatic clay recovery process.

* * * * *